J. DANZ, 2D.
COMBINED GAME AND SHELL BAG.
APPLICATION FILED DEC. 2, 1916.
Reissued Sept. 25, 1917.
14,365.
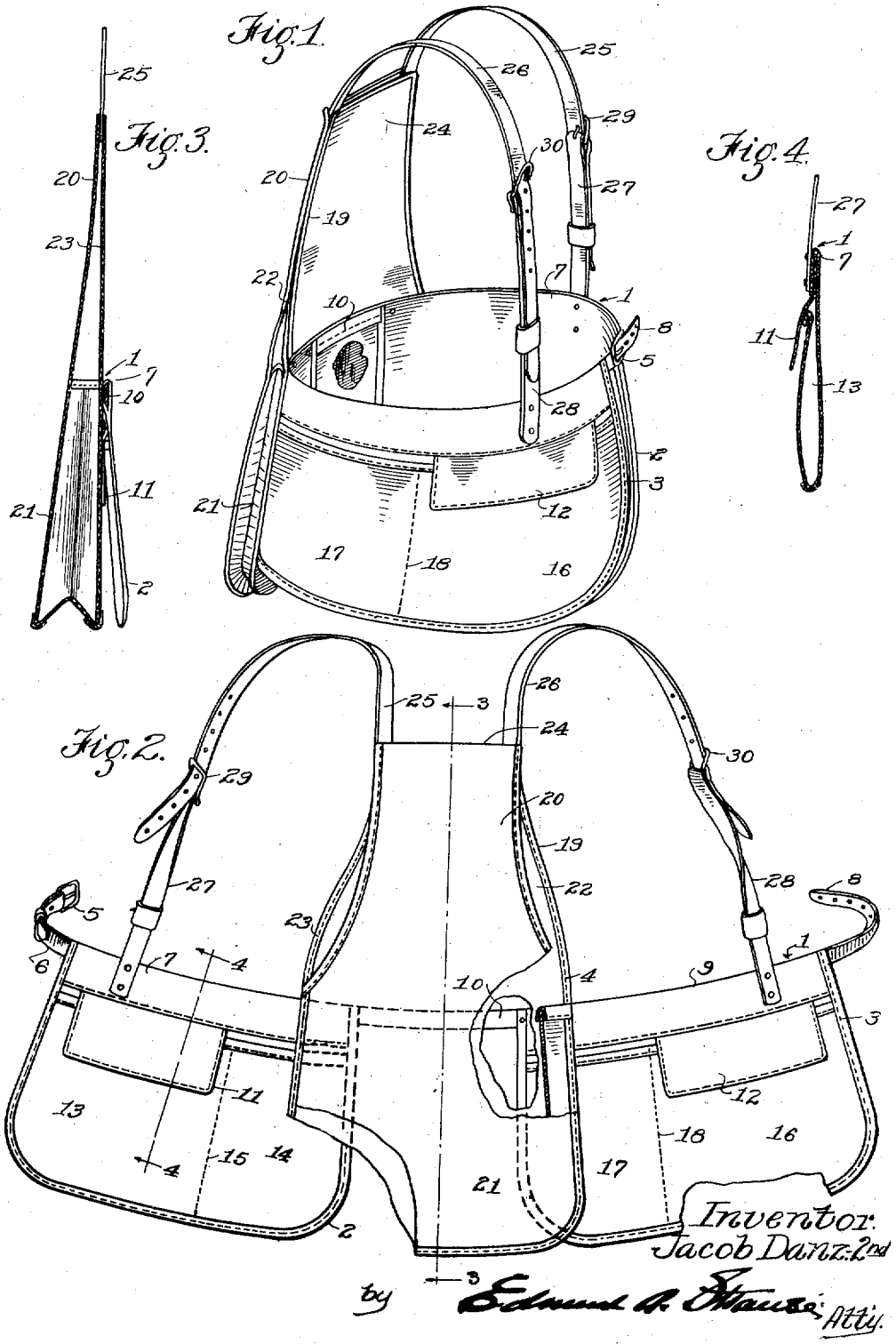

UNITED STATES PATENT OFFICE.

JACOB DANZ, 2D, OF LOS ANGELES, CALIFORNIA.

COMBINED GAME AND SHELL BAG.

14,365. Specification of Reissued Letters Patent. Reissued Sept. 25, 1917.

Original No. 1,141,941, dated June 8, 1915, Serial No. 7,011, filed February 9, 1915. Application for reissue filed December 2, 1916. Serial No. 134,755.

*To all whom it may concern:*

Be it known that I, JACOB DANZ, 2d, a citizen of the United States, residing at Los Angeles, in the county of Los Angeles and State of California, have invented a new and useful Combined Game and Shell Bag, of which the following is a specification.

My object is to make a combined game and shell bag which will occupy the least possible space when empty, and which will carry the largest possible amount of game and shells with the least inconvenience, and my invention consists of the novel features herein shown, described and claimed.

Figure 1 is a perspective of the combined game and shell bag embodying the principles of my invention and the parts occupying the position as in use.

Fig. 2 is a perspective of the combined game and shell bag flattened out.

Fig. 3 is a vertical cross section on the line 3—3 of Fig. 2.

Fig. 4 is a vertical sectional detail on the line 4—4 of Fig. 2.

The leading or principal parts of my game and shell bag are the belt 1, shell compartments 2 and 3 secured to the belt 1 near its ends and the game compartment 4 secured to the belt 1 at its center and overlapping the shell compartments 2 and 3.

The details of the belt 1 are as follows: The buckle 5 is secured to a strap 6 and the strap 6 is secured to the canvas band 7. The perforated strap 8 is adapted to fit the buckle 5 and is secured to the canvas band 9 and the strap 10 connects the bands 7 and 9 so as to encircle the body of the hunter. The shell bag 2 extends downwardly from the band 7, the opening of the bag being covered by the flap 11. The shell bag 3 extends downwardly from the band 9 and the opening of the bag is covered by the flap 12. The flap 11 covers the opening to the compartment 13 of the shell bag 2 and the compartment 14 of the shell bag is partly covered by the game bag 4, said compartments 13 and 14 being separated by a line of stitching 15. The flap 12 covers the compartment 16 of the shell bag 3 and the compartment 17 is partly covered by the game bag 4, the compartments 16 and 17 being separated by a line of stitching 18.

The details of the game bag 4 are as follows: The inner section 19 and the outer section 20 are connected across their lower edges half way up the sides by canvas forming an accordion plait 21, said sections 19 and 20 being substantially mates and the accordion plait serving to allow the sections to fit flat together, when the bag is empty, and to expand when game is inserted. The game bag 4 is attached to the strap 10 at the upper ends of the accordion plait 21 and from the strap 10 upwardly the edges of the sections 19 and 20 are not connected together, thereby leaving openings 22 and 23 for the insertion of game. The sections 19 and 20 are connected together across their upper ends on the line 24. The straps 25 and 26 extend upwardly from this line 24 over the shoulders of the wearer and downwardly in front and straps 27 and 28 are attached to the bands 7 and 8 and extend upwardly; and buckles 29 and 30 are secured to the upper ends of the straps 27 and 28 for engagement with the ends of the straps 25 and 26.

When the shell compartments and the game compartment are empty, the device occupies very little space, that is, it flattens out thin and at the same time means are provided for allowing the compartments to expand almost indefinitely as they are filled with game or shells.

The details of construction may be varied in many ways without departing from the spirit of my invention, as set up in the following claims:

What I claim is:

1. A belt, shell compartment secured to the ends of the belt, an inner section secured to the center of the belt and overlapping the shell compartments, an outer section parallel with the inner section, an accordion plait connecting the outer section and the inner section below the belt, said outer and inner sections extending some distance above the belt with their edges unconnected and straps connecting the upper ends of the inner and outer sections to near the ends of the belt.

2. A combined game and shell bag, comprising a belt, shell compartments secured to the ends of the belt and extending downwardly, an inner section secured to the center of the belt and extending upwardly and downwardly and overlapping the shell compartments, an outer section parallel with the inner section, an accordion plait connecting the outer section and the inner section along the edges below the belt, the outer and inner sections being unconnected along their side edges above the belt and connected together across their upper edges, and straps connecting the upper corners of the inner and outer sections to near the ends of the belt.

3. A game bag construction, comprising a body structure adapted to be suspended from a person's body and having shell compartments arranged to be disposed upon the opposite sides of the body, and an expansible game bag secured to the rear of said body structure overlapping the shell compartments, said bag comprising outer, inner and vertical side faces, the outer face of said game bag extending upwardly and beyond the side faces thereof and having its terminating upper edge secured to the body structure whereby opposing side openings are formed therein.

JACOB DANZ, 2ND.

Copies of this patent may be obtained for five cents each, by addressing the "Commissioner of Patents. Washington, D. C."